US009140140B2

(12) United States Patent
McMillan

(10) Patent No.: US 9,140,140 B2
(45) Date of Patent: Sep. 22, 2015

(54) COMPOSITE FLANGE ELEMENT

(75) Inventor: Alison J McMillan, Uttoxeter (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 13/451,061

(22) Filed: Apr. 19, 2012

(65) Prior Publication Data

US 2012/0270006 A1 Oct. 25, 2012

(30) Foreign Application Priority Data

Apr. 21, 2011 (GB) .................................. 1106794.9

(51) Int. Cl.
*B32B 3/14* (2006.01)
*B32B 17/02* (2006.01)
*F01D 25/24* (2006.01)

(52) U.S. Cl.
CPC ...... *F01D 25/243* (2013.01); *F05D 2300/6034* (2013.01)

(58) Field of Classification Search
USPC ........... 428/77, 105, 107, 108, 109, 110, 111, 428/113, 292.1, 119; 415/200, 214.1, 415/213.1, 220; 285/290.1, 290.2, 290.3, 285/290.4, 412, 416; 416/229 R, 230, 229 A
See application file for complete search history.

(56) References Cited

U.S. PATENT DOCUMENTS

| | | | | |
|---|---|---|---|---|
| 4,101,150 A * | 7/1978 | Thawley et al. | 285/226 |
| 4,331,723 A | 5/1982 | Hamm | |
| 5,919,543 A * | 7/1999 | McCarville et al. | 428/112 |
| 7,045,084 B1 * | 5/2006 | Reis et al. | 264/138 |
| 7,749,927 B2 * | 7/2010 | Blanton et al. | 442/381 |
| 2009/0060733 A1 * | 3/2009 | Moon et al. | 415/214.1 |
| 2009/0098337 A1 * | 4/2009 | Xie et al. | 428/121 |
| 2010/0150706 A1 * | 6/2010 | Xie et al. | 415/200 |

FOREIGN PATENT DOCUMENTS

| | | |
|---|---|---|
| EP | 1 927 731 A2 | 6/2008 |
| GB | 1065385 | 4/1967 |
| GB | 1 497 107 | 1/1978 |
| GB | 1 509 271 | 5/1978 |
| WO | WO 02/16197 A1 | 2/2002 |

OTHER PUBLICATIONS

Aug. 16, 2011 Search Report issued in British Patent Application No. GB1106794.9.

* cited by examiner

*Primary Examiner* — Aaron Austin
*Assistant Examiner* — Joanna Pleszczynska
(74) *Attorney, Agent, or Firm* — Oliff PLC

(57) ABSTRACT

A composite flange element formed on a casing comprising a portion of a component and an adjoining flange portion, the composite having a ply layup comprising: one or more first plies extending over both the portion of the component and the flange portion; one or more second plies extending over the flange portion; and one or more third plies extending over the portion of the component; wherein the first, second and third plies are selected to provide desirable properties for the portions over which they extend. The flange element so formed consists of one or more load spreading features associated with the flange portion and one or more stress reduction features in the region where the portion of the component meets the flange portion. Preferably the plies are arranged or interleaved such that they run up the case and flange without distortion.

22 Claims, 6 Drawing Sheets

COMPOSITE FLANGE ELEMENT

This invention relates to a composite flange element, and particularly but not exclusively relates to a composite flange element for a turbomachine component.

BACKGROUND

Where two components are to be connected, it is conventional to provide each component with a flange which abuts with the opposing flange and provides a means for connecting the two components. In addition, the flanges may also provide additional strength and stiffness to the components.

As shown in FIG. 1, flanges are often used with tubular components, particularly cylindrical components. However, the components may be hemispherical, conical or other similar structures. The component 2 of FIG. 1 has a flange portion 4 projecting substantially perpendicularly to a portion 6 of the component 2. The flange portion 4 is provided with a plurality of holes 8 passing therethrough for connection with an abutting flange. FIG. 2 shows a partial cross-section through the component 2, with the dashed line representing a central axial axis of the component.

The component 2 may be a casing component of a turbomachine. Conventionally, such a casing component would be manufactured from a metal, such as a titanium or a nickel alloy. Advantageously, metallic components usually have near homogeneous material properties irrespective of the component shape and method of manufacture.

The same can not be said for composite materials, particularly fibre reinforced organic matrix composites, which are highly heterogeneous. The properties of these materials depend on the local fibre orientation and the strength and stiffness of the material may vary greatly between regions of the component. It is however desirable to use such composite materials since they are generally lighter than metallic materials and may be cheaper than high-strength low-density metals, such as titanium. Furthermore, particular directionality of strength can be tuned by appropriate selection of ply material and orientation.

A composite component may be designed to ensure that it has the desired properties by selectively aligning the fibres in the composite material with the directions of anticipated loads. This may be performed on a local scale such that localised regions of the component are provided with appropriately oriented fibres to produce the desired properties for that region.

For example casing components are often designed to withstand pressure vessel loads, to provide roundness stability, and to guarantee containment of a blade in the event of a blade-off. The main body of the component therefore has to have good hoop and axial strength and stiffness.

The flange portion of the component must maintain its shape under asymmetric loading to prevent leakage from the interface between the two components.

The present invention provides a composite flange having a ply layup which provides desirable properties for the flange and which enables the metal flange to be replaced by a composite material.

STATEMENTS OF INVENTION

According to the invention there is provided a composite flange element as set out in the claims.

The present invention provides a composite flange having a ply layup which provides desirable properties for the flange and which enables the metal flange to be replaced by a composite material. This has benefits to weight, cost and durability of the components.

The present invention has particular application in turbomachines, particularly for casing components.

BRIEF DESCRIPTION OF THE DRAWINGS

For a better understanding of the present invention, and to show more clearly how it may be carried into effect, reference will now be made, by way of example, to the accompanying drawings, in which:—

DETAILED DESCRIPTION

Figure 1:
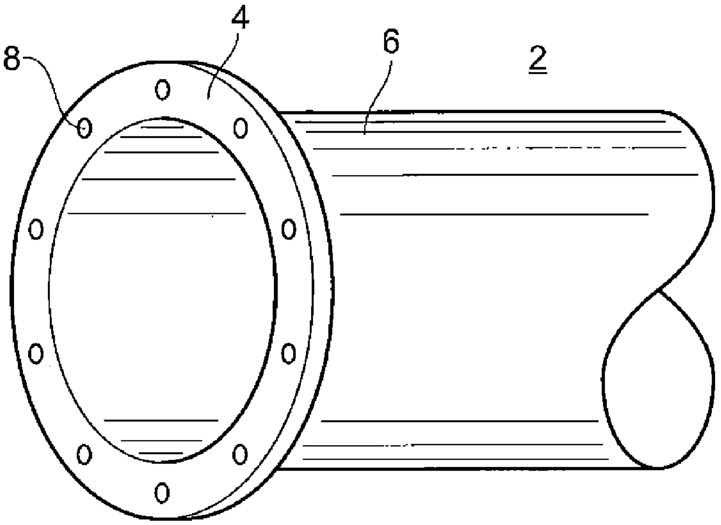
FIG. 1 is a side perspective view of a prior art tubular component having a metallic flange.
Figure 2:
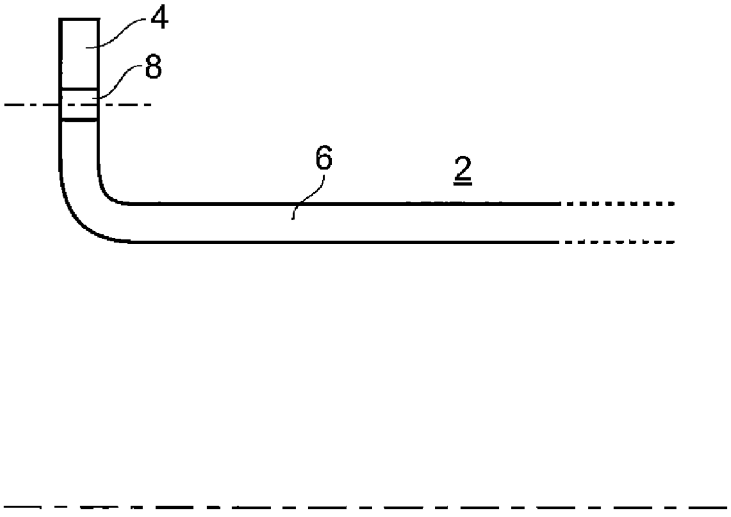
FIG. 2 is a cross-section through the component of FIG. 1.
Figure 3:
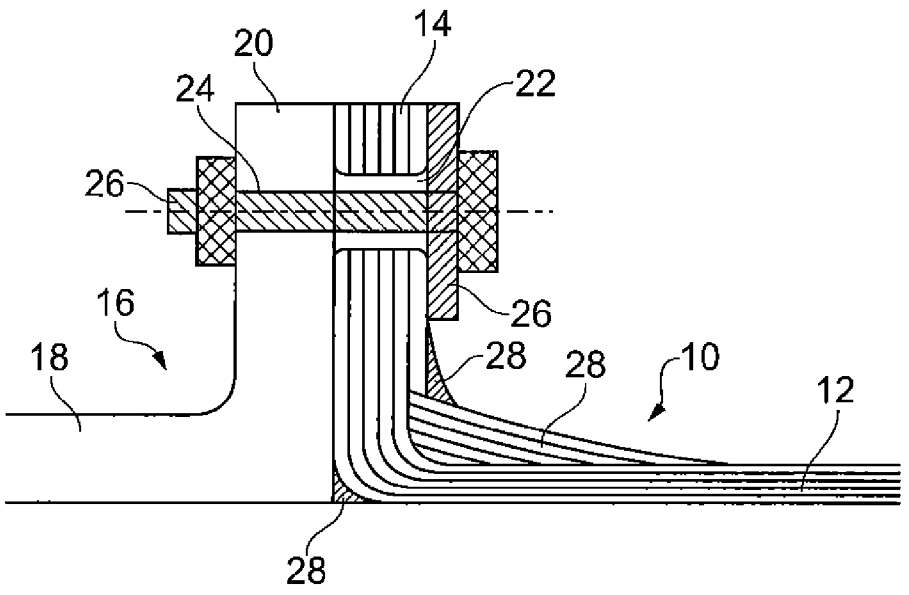
FIG. 3 is a cross-section through a component in accordance with a first aspect of the invention, which is shown connected to another component.

FIG. 3 shows a section through a composite flange element 10 in accordance with an aspect of the invention. The flange element 10 is part of a component, such as the component 2 shown in FIGS. 1 and 2, and comprises a cylindrical portion 12 of a component and a flange portion 14. The flange portion 14 and the cylindrical portion 12 of the component are substantially perpendicular to one another, however this need not be the case and other orientations may be used, as will be described in more detail below. Also other shapes of component are contemplated. For example, the flange portion 14 may be connected to a tubular portion 12 which may not be cylindrical. For example, it may have a square or oval cross section and may taper along its length.

The composite flange element is shown abutted to a second flange element 16. The second flange element 16 may be a metal flange element, such as that shown in FIGS. 1 and 2, but equally may be a composite flange element in accordance with an aspect of the invention. The second flange element has a cylindrical portion 18 and a flange portion 20. The flange portions 14, 20 of the composite and second flange elements 10, 16 abut one another and are connected through holes 22, 24 by a bolt 26, although other fastening means such as screws, rivets, welds or adhesive may be used. A plurality of holes 22, 24 may be spaced around the circumference of the flange portions 14, 20.

The hole 22 in the composite flange element 10 is sufficiently larger in diameter than the bolt 26 to prevent the bolt 26 from contacting the composite material under conditions such as thermal expansion, bolt misalignment, etc. Such contact may cause damage to the composite material. Care should also be taken to avoid snagging the thread of the bolt 26 on the composite material as the bolt is threaded through the hole. The bolt is provided with a washer 26 to spread the clamping load of the bolt and to avoid crush type failures at the edge of the hole. Alternatively, a metallic annular washer may be provided with a series of holes passing therethrough, which correspond to the holes around the circumference of the composite flange element 10. Such a configuration would spread the clamping load of the bolts equally around the composite flange element 10 and could also be made thicker to provide additional stiffness to the flange portion 14, if required. The annular washer may be formed from two or more arcuate sections to allow the washer to be fitted more easily. For example, the washer may be formed from two semicircular sections. As shown in FIG. 3, the openings in the hole 22 may be chamfered or countersunk to further spread the clamping load of the bolt and to avoid stress concentrations at the edge of the hole where it meets the washer 26.

In other embodiments of the invention, the load-spreading feature may be provided by one or more additional layers of material provided outward of the composite plies. These layers may be formed of glass fibre composite material, metallic material, or of polymer material. If more than one such layer is provided, they may be of the same or of different materials. Particularly suitable polymers would be those having a relatively low coefficient of friction, such as PTFE, or such as glass fibre strip impregnated with PTFE and sold under the registered trade mark "Vespel".

The inner and outer corners where the portion 12 of the component meets the flange portion 14 may be provided with discontinuous fibres 28 in order to reduce the stress in this region of the composite flange element. These regions are resin-rich and it is difficult to provide structural fibres here. The discontinuous fibres may be provided by packing a filler preform into the mould or by using chopped fibre. The discontinuous fibres may be provided in one or more of the positions marked 28 in FIG. 3.

Alternatively, these resin-rich regions may be removed by modifying the geometry of the composite flange element 10. Further still, the inner and outer corners may be manufactured so that they are over-sized and subsequently machined back to the desired shape. This would allow structural fibres to be used in these regions; however, the machining process would result in the fibres becoming discontinuous.

Figure 4:
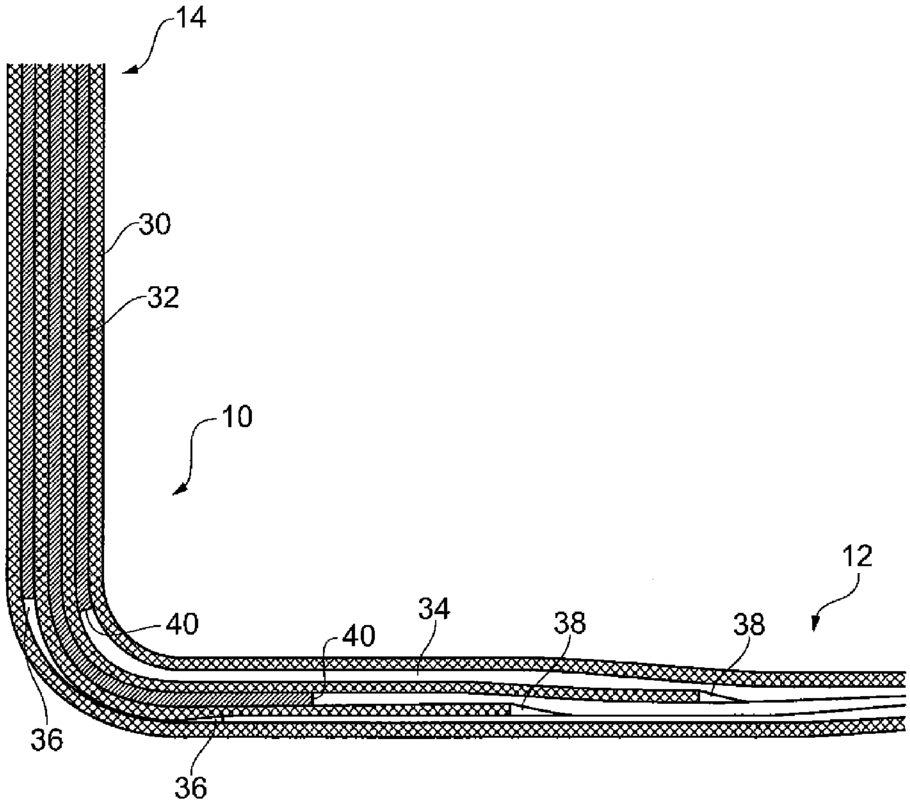
FIG. 4 is an enlarged view of the component of FIG. 3, showing the ply layup of the component.

The ply layup of the composite flange element 10 will now be described with reference to FIG. 4. FIG. 4 is a schematic drawing and generally there would be far more plies than those shown. These may be comprised of blocks of plies (a stack of multiple plies cut to the same shape and handled together), thicknesses of 3D woven or stacked Non-Crimp-Fibre (NCF), or preforms held together by stitching, tufting or use of tackifiers. Alternatively, there could be many more single layers of unidirectional (UD) or woven material; layers of over-braiding (i.e. the casing structure is built up over a mandrel and passed though a braiding machine); or layers of filament winding (i.e. again built up on a mandrel, but in this case spun with fibre wrapping around it); or any combination of these methodologies.

The ply layup comprises one or more first plies 30 indicated by the cross-hatched portions, one or more second plies 32 indicated by the striped portions and one or more third plies 34 indicated by the blank portions. The ply layup further comprises resin-rich areas 36, ply drops 38 and ply butts 40. The ply drops 38 are located where the first plies 30 terminate and the ply butts are located where the second plies 32 abut the third plies 34.

The first plies 30 extend over both the cylindrical portion 12 of the component and the flange portion 14. The second plies 32 extend over the flange portion 14 and one or more of the second plies 32 may optionally extend partially over the cylindrical portion 12 of the component. However, where the second plies 32 extend over the cylindrical portion 12 of the component, this is to a lesser extent than the first plies 30. The third plies 34 extend over the cylindrical portion 12 of the component and one or more of the third plies 34 may optionally extend partially over the flange portion 14. However, where the third plies 34 extend over the flange portion 14, this is again to a lesser extent than the first plies 30.

The outermost layers of the first plies 30 cover the entire component. Inner layers of the first plies 30 may be curtailed to reduce weight. The outermost layers of the first plies 30 are generally the surfaces layers of the component, however additional layers may be added post-curing, such as internal liners, or surface protection layers such as anti-erosion material, or paint.

The specific fibre orientation, structure and method of construction of the first, second and third plies will now be described with reference to FIGS. 5 to 8.

Figure 5:
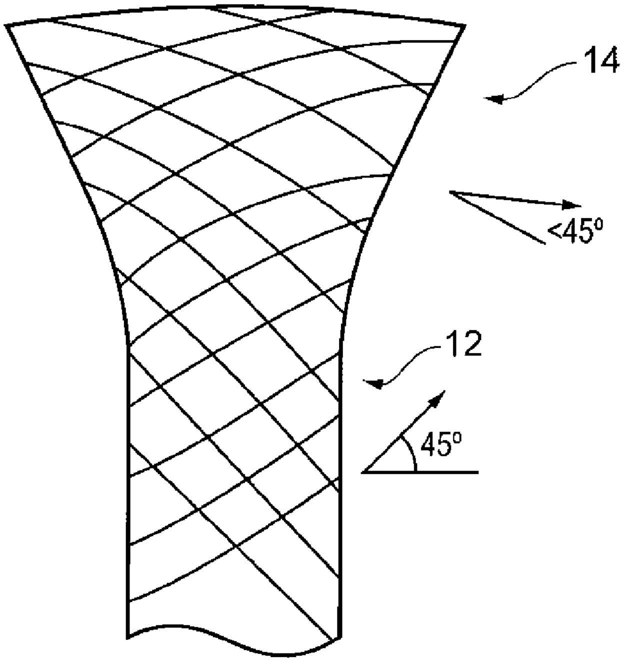
FIG. 5 shows the fibre orientation for a first ply type.

FIG. 5 shows the fibre orientation for the first plies 30. The first plies comprise a portion which corresponds to the cylindrical portion 12 of the component and a portion which corresponds to the flange portion 14. Over the cylindrical portion 12 of the component the fibres are oriented at 45° and thus take a helical path. Angles other than 45° may be used to vary the balance between torsional stiffness, hoop stiffness and axial stiffness. Angles may also vary on non-cylindrical shapes. These helical fibres provide torsional stiffness to the component. The first plies also provide protection from low energy impacts, such as from tool drops. The flange portion 14 also has helical fibres. When formed around the bend between the cylindrical portion 12 of the component and the flange portion 14 the fibres turn towards a circumferential or hoop orientation and thus are angled at less than 45°.

The first plies 30 may be formed by braiding, which is a specific known method of interleaving tows or fibres. By using braiding, the first plies are formed as tubes which can follow the flange portion geometry without having a join or fold. Alternatively, the first plies may be formed by other methods of interleaving and interlocking, such as weaving or 3D weaving, knotting, felting, knitting or tatting. Filament winding is a form of 1.5D weaving, which may also be used.

Figure 6:
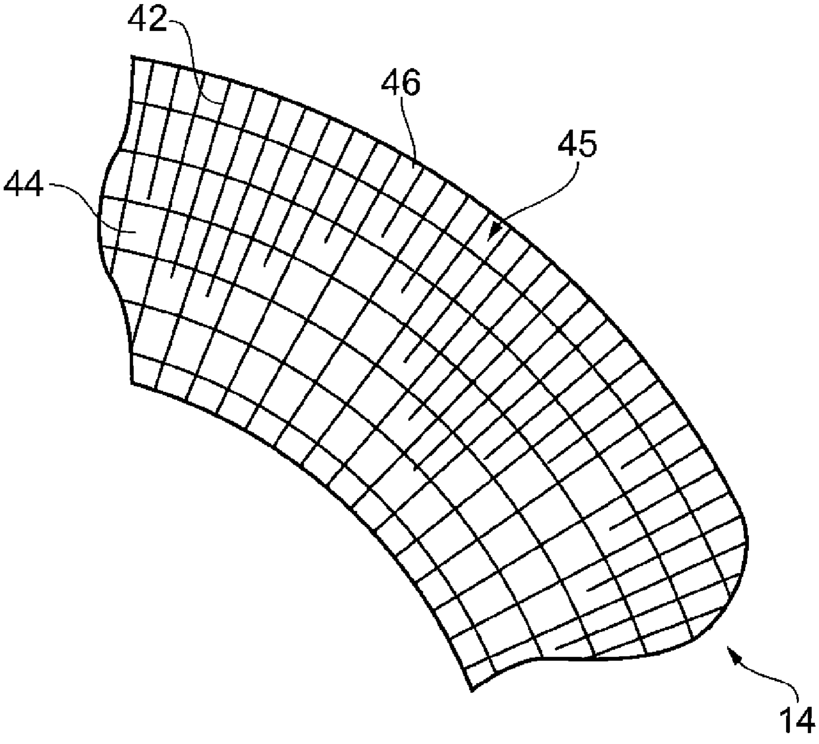
FIG. 6 shows the fibre orientation for a second ply type.

FIG. 6 shows the fibre orientation for the second plies 32, over a section of the flange portion 14. The second plies 32 comprise radially oriented fibres 42 and circumferentially oriented fibres 44. The radial fibres 42 provide stiffness and strength to the flange portion 14 and the circumferential fibres provide hoop strength. The circumferential fibres 44 may not be necessary since, as described above, the helical fibres of the first plies 30 turn towards the circumferential or hoop orientation and thus provide hoop strength. Additional radial fibres 46 may be added at larger diameters.

The second plies may be formed by tailored fibre placement. This is where tows of fibres are oriented in the desired directions and then stitched into place onto a backing sheet 45.

Figure 7:
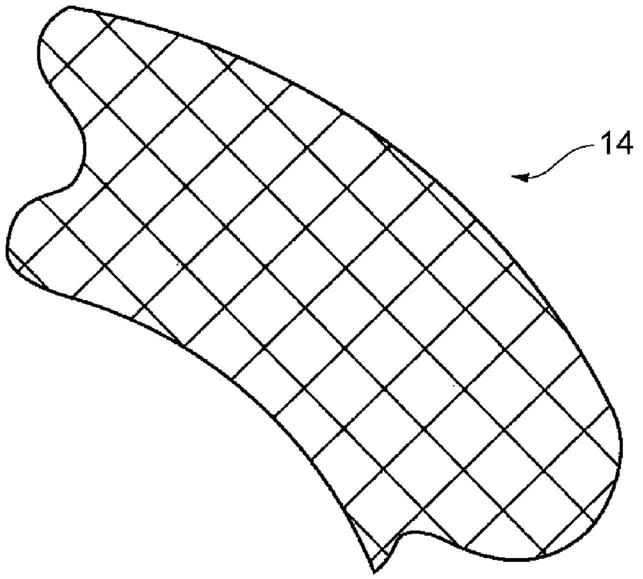
FIG. 7 shows an alternative fibre orientation for the second ply type.

Alternatively, several layers of standard fabric, as shown in FIG. 7, having orthogonally oriented fibres may be used to create a similar effect. The layers are placed in different orientations around the flange portion 14, such that there are radially and circumferentially oriented fibres at positions around the flange portion 14 created by one of the layers. A larger number of layers creates an increasingly similar effect to that of tailored fibre placement, but at a lower cost.

Figure 8:
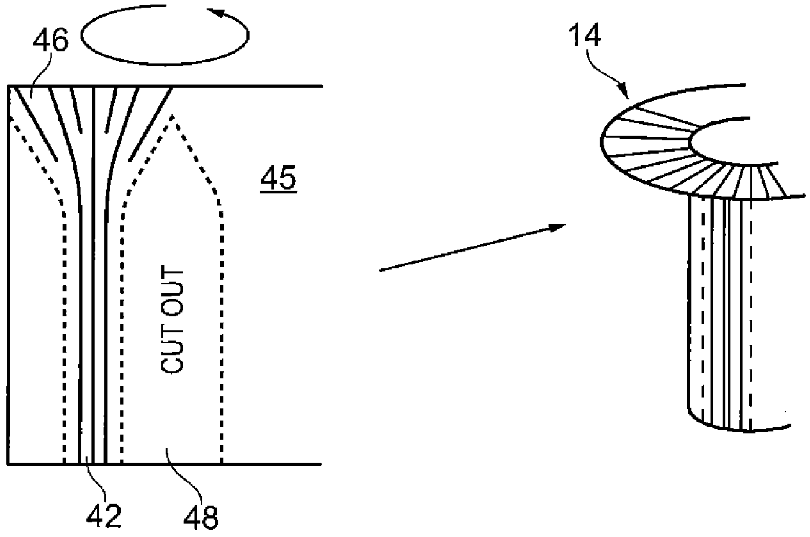
FIG. 8 shows a method of manufacturing the second ply type into the component shape.

As shown in FIG. 8, tailored fibre placement may be used to create a 3D shape from a flat backing sheet 45. This allows the second plies 32 to be extended into the cylindrical portion 12 of the component. The radial fibres 42 and additional radial fibres 46 may be stitched onto a flat backing sheet which is then darted to create the 3D shape. During the darting process, the section 48 is cut out from the backing sheet 45 and the cut edges are brought together to form the 3D shape shown on the right hand side of FIG. 8. The cut edges may be brought together by tacking the edges using glue or tackifier, or stitching the ply straight into place onto the previous layer(s).

It is beneficial to provide a large number of darts so as to reduce wrinkling in the backing sheet 45. This may also be improved by using a lightweight material which can accommodate the draping required or by providing smaller darts between the fibres.

The circumferential fibres 44 may then be stitched onto the flange portion 14. Alternatively, filament winding or tape laying may be used to apply such a layer of fibres.

The third plies 34 extend over the cylindrical portion 12 of the component and are required to provide the component with stiffness in both circumferential and axial directions. The third plies 34 may be a single layer woven fabric such as a 5 harness satin weave, which has not too much crimp but is interwoven enough to hold together during manufacturing. This is preferably wrapped around the barrel several times, so that the start and finish line of weakness is minimised.

Alternatively a multi-layer fabric may be chosen, such as a 3 or 4 ply Non Crimp Fabric (NCF). In this material, the 0 and 90 degree fibres are virtually un-crimped, and held in place by very light interwoven fibres. The advantage of this material is that the material is inherently stiffer, because the crimping is eliminated, and layup is also quicker as several thicknesses of material are handled in each ply. However, in contrast to a single layer fabric, the join line of weakness is more pronounced and can only be minimised over several blockings of layup. In addition, the material is less easily draped, making it difficult to shape it around even a part of the flange portion 14. This problem may be solved by using a 3D woven fabric, but such a fabric would not be as inherently stiff. However, a 3D woven material may be suited to use in a containment casing, where deflection under impact and spreading out the area of impact damage is desirable.

Possibly the most effective pre-forming method to obtain hoop and axial stiffness simultaneously, and avoid the join problem, is to use 2½ D braiding. This is like 2D braiding, in that it creates a tube of material that is wrapped over a mandrel. The difference is that axial fibres are also added, so that the tube is no longer "stretchy" (cannot be made to grow or shrink in diameter), as the axial fibres constrain it. In this way, the axial fibres constrain the shape so that the act of braiding creates a given shape, rather than a shape that can change by shearing of the fibres. Obviously the axial fibres are needed to provide axial stiffness to the cylindrical portion 12 of the component. The relative proportion of axial fibres can be chosen. The hoop stiffness is provided by the other fibres, which instead of being loosely braided in a very open form at a nominal 45°, they are packed at as shallow an angle as possible. In this way, they are very nearly hoop aligned, closely spaced, and braided straight into position, so the alignment and packing tolerance is good.

If hoop stiffness needs further enhancement, filament winding may be used. This may be in combination with UD or with NCF or woven fabric with a higher tow number in the axial direction. This also has the benefit of minimising the join line problem.

Figure 9:
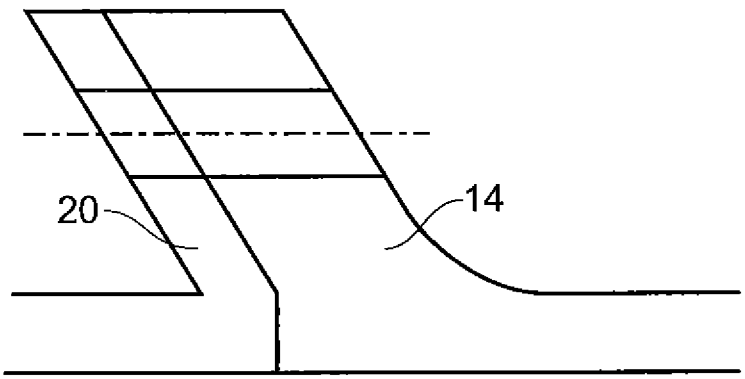
FIG. 9 is alternative configuration for a flange of the component.

FIG. 9 shows an alternative embodiment of the invention, in which the flange portions 14 and 20 are angled. Such an arrangement allows filament winding to be used for the first plies 30.

The invention claimed is:

1. A composite flange element, the flange element comprising a portion of a gas turbine engine casing and an adjoining flange portion, the flange element having a ply layup defining the portion of the gas turbine engine casing and defining the adjoining flange portion, the ply layup comprising:
- a plurality of first plies forming part of both the portion of the gas turbine engine casing and the flange portion;
- a plurality of second plies forming part of the flange portion, one or more of the second plies forming part of the flange portion only; and
- a plurality of third plies forming part of the portion of the gas turbine engine casing, one or more of the third plies forming part of the gas turbine engine casing only;
- wherein the first, second and third plies are selected to provide desirable properties for the portions which they form part of, each of the first, second, and third plies having a different construction;
- the flange element further comprising:
  - one or more load spreading features associated with the flange portion; and
  - one or more stress reduction features associated with the region where the portion of the gas turbine engine casing meets the flange portion, and wherein the second plies that form part of the flange portion only are next to the first plies and at least one of the second plies extends to the gas turbine casing and at least two of the first plies are adjacent to both of the at least one of the second plies and one of the second plies that form part of the flange portion only.

2. A composite flange element as claimed in claim 1, wherein one or more of the second plies also form a portion of the gas turbine engine casing, to a lesser extent than the first plies.

3. A composite flange element as claimed in claim 1, wherein one or more of the third plies also form part of the flange portion, to a lesser extent than the first plies.

4. A composite flange element as claimed in claim 1, wherein the first plies are formed by weaving, braiding, interleaving, felting knitting or tatting.

5. A composite flange element as claimed in claim 1, further comprising a layer of glass fibre material and/or a layer of a polymer outward of the composite plies.

6. A composite flange element as claimed in claim 5, wherein the polymer is an aromatic polyimide or PTFE.

7. A composite flange element as claimed in claim 1, wherein the second plies are formed by layering several layers of fabric, each layer of fabric having orthogonal fibres, wherein the flange portion is curved and the layers are placed in different orientations such that there are radially and circumferentially oriented fibres around the flange.

8. A composite flange element as claimed in claim 1, wherein the first plies comprise helical fibres.

9. A composite flange element as claimed in claim 1, wherein the third plies are a woven fabric.

10. A composite flange element as claimed in claim 9, wherein the third plies are a 5 harness satin weave.

11. A composite flange element as claimed in claim 9, wherein the third plies are a multiple ply non crimp fabric.

12. A composite flange element as claimed in claim 9, wherein the woven fabric is one or more of: an angle interlock weave, a layer-to-layer weave or an orthogonal weave.

13. A composite flange element as claimed in claim 1, wherein the third plies are formed by 2½ D braiding or interleaving.

14. A composite flange element as claimed in claim 1, wherein the third plies are formed by filament winding.

15. A composite flange element as claimed in claim 1, in which the load spreading feature comprises an annular washer.

16. A composite flange element as claimed in claim 1, wherein the portion of the gas turbine engine casing and the adjoining flange portion are arranged in a non-parallel manner with respect to each other.

17. A composite flange element as claimed in claim 1, wherein the portion of the gas turbine engine casing and the adjoining flange portion are arranged substantially perpendicular with respect to each other.

18. A composite flange element as claimed in claim 1, wherein the one or more stress reduction features are discontinuous fibres.

19. A composite flange element as claimed in claim 1, wherein one of the stress reduction features is arranged proximate to an inner corner formed at the region where the portion of the gas turbine engine casing meets the flange portion and another of the stress reduction features is arranged proximate to an outer corner formed at the region where the portion of the gas turbine engine casing meets the flange portion.

20. A composite flange element as claimed in claim 1, wherein:

the second plies provide resistance to asymmetric loading;

the first plies provide torsional stiffness to the flange element; and the third plies provide radial and/or axial stiffness.

21. A composite flange element as claimed in claim 1, wherein two or more first plies each form both (i) part of the portion of the gas turbine engine casing and (ii) part of the flange portion.

22. A composite flange element as claimed in claim 21, wherein:

the ply layup bends between the flange portion and the portion of the gas turbine engine; and one of the first plies is formed along a radially outer region of the bend and the other of the first plies is formed along a radially inner region of the bend.

* * * * *